United States Patent Office 3,527,870
Patented Sept. 8, 1970

3,527,870
ANTHELMINTIC COMPOSITIONS CONTAINING BENZOYLETHYL QUATERNARY AMMONIUM COMPOUNDS AND A METHOD THEREFOR
Alfred Margot, Basel, and Jean-Jacques Gallay, Birsfelden, Switzerland, assignors to Geigy Chemical Corporation, Greenburgh, N.Y., a corporation of Delaware
No Drawing. Original application Jan. 20, 1966, Ser. No. 521,831, now Patent No. 3,453,313, dated July 1, 1969. Divided and this application Nov. 1, 1968, Ser. No. 798,520
Claims priority, application Switzerland, Jan. 29, 1965, 1,280/65
Int. Cl. A61k 27/00
U.S. Cl. 424—329
5 Claims

ABSTRACT OF THE DISCLOSURE

Quaternary benzoylethyl ammonium compounds, including new compounds which have amino groups in the para-position of the phenyl ring, are useful as anthelmintic agents.

---

This application is a division of our copending application Ser. No. 521,831, filed Jan. 20, 1966, now U.S. Pat. No. 3,453,313.

The present invention concerns new anthelmintically active compositions and feedstuffs which contain quaternary ammonium compounds as active substances, their use for combatting parasitic helminths and for the prevention of helminthiasis as well as other syndromes caused by the presence of helminths, and concerns also a process for the production of the new active substances as well as that of the aforesaid compositions. Furthermore the present invention concerns new quaternary ammonium compounds. The compositions according to the invention can be either in the form of veterinary-medicinal preparations or of feed additions.

In the present description the term "helminths" refers to nematodes, cestodes and trematodes i.e. to worms which infest the gastrointestinal tract, the liver and other organs.

Of the endoparasites which occur in farm or domestic animals, helminths are among those which cause the greatest damage to these animals. Not only do the animals attacked show retarded growth or poor increase in weight because of the insufficient utilisation of feed given to them, but often injuries occur which can result in the death of the animals. It is, therefore, of great importance to develop veterinary agents and feed additives which are suitable for combatting helminths in all stages of their development and for preventing damages caused by them (helminthiasis). Up to the present, a number of substances have been recommended as anthelminthics, but they are not completely satisfactory, be it that they show only a very specific action on certain helminthes or that their action is either weak if applied in toxicologically tolerable doses, or that undesirable side effects appear leading to severe organic injuries if they are applied in fully effective doses. For example, allyloxy-phenyl isothiocyanate described as an anthelmintic agent is of considerable toxicity.

It has now been found that veterinary-medical agents or feed additions which contain as active ingredients quaternary ammonium compounds of the general Formula I:

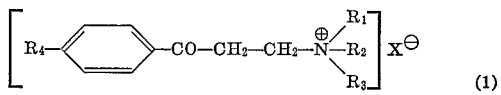

(1)

wherein:

$R_1$ represents an alkyl, alkenyl or alkynyl radical, each of which radicals has maximally 4 carbon atoms.

$R_2$ represents an alkyl radical having from 1 to 4 carbon atoms, the benzyl or phenethyl radical or a benzyl or phenethyl radical mono- or polysubstituted by halogen atoms, by alkoxy or alkylthio groups having from 1 to 4 carbon atoms or by methyl, hydroxyl, nitro or cyano groups, or $R_1$ and $R_2$ together with the nitrogen atom to which they are linked represent the pyrrolidine, piperidine, morpholine or thiamorpholine radical, or a methylated pyrrolidine, piperadine, morpholine or thiamorpholine radical, $R_3$ represents an alkyl radical having from 1 to 4 carbon atoms, and in the case that $R_2$ is an alkyl radical, $R_3$ may also represent the benzyl or phenethyl radical or a benzyl or phenethyl radical mono- or polysubstituted by halogen atoms, by alkoxy or alkylthio groups having from 1 to 4 carbon atoms or by methyl, hydroxyl, nitro or cyano groups, $R_4$ represents hydrogen, a halogen atom, the hydroxyl or nitro group, an alkyl or alkoxy radical having 1 to 12 carbon atoms, the methylthio or ethylthio radical, the amino group or a monoalkylamino or dialkylamino radical having from 1 to 4 carbon atoms in each alkyl moiety, an alkanoyl or alkenoylamino radical having at most 5 carbon atoms or the benzoylamino radical, and X represents an anion of an inorganic or organic acid which affords a salt of Formula I which is therapeutically acceptable and well tolerated by the animal organism, are very effective against helminths and that, because of their low toxicity in warm blooded animals and good tolerance by the organism, these substances are very well suited for combatting the said endoparasites and for controlling the disturbances and symptoms caused by them. When used as ingredients of feed additives, these substances contribute to a rapid increase in weight, better utilization of the feed, and an improvement in the general state of health of the animals. Feed additives containing these compounds have, therefore, special importance for the feeding of farm and domestic animals, in particular for that of growing animals, e.g. of young pigs, cattle, in particular farrows, calves or lambs, but also horses, dogs, rodens, fur-bearing animals, fowls, chicken, pets or caged birds.

As anion of an inorganic or organic acid which is non-toxic to the animal organism there are suitable for example those of hydrochloric acid, hydrobromic acid, hydroiodic acid, sulfuric acid, alkyl-sulfuric acids, perchloric acid, phosphoric acid, naphthoic acids, embonic acid and pamoic acid.

Some of the active substances of general Formula I are known and all can be obtained by known processes, for example by quaternising the corresponding tertiary amines.

A particularly good anthelmintic effect is attained with feed additives which contain, as active ingredient new quaternary ammonium compounds of the Formula II

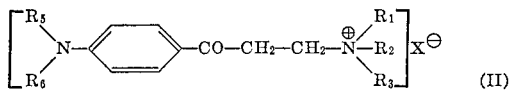

(II)

wherein:

$R_1$ represents an alkyl, alkenyl or alkynyl radical each of which radicals has not more than 4 carbon atoms, $R_2$ represents an alkyl radical having from 1 to 4 carbon atoms, the benzyl or phenethyl radical or a benzyl or phenethyl radical mono- or polysubstituted by halogen atoms, by alkoxy or alkylthio groups having from 1 to 4 carbon atoms or by methyl, hydroxyl, nitro or cyano groups, or $R_1$ and $R_2$ together with the nitrogen atom to which they are linked represent the pyrrolidine, piperidine, morpholine or thiamorpholine radical or a methylated pyrrolidine, piperidine, morpholine or thiamorpholine radical $R_3$ represents an alkyl radical having from 1 to 4 carbon atoms and in the case that $R_2$ is an alkyl radical, $R_3$ may also represent the benzyl or phenethyl radical or a benzyl or phenethyl radical mono- or polysubstituted by halogen atoms, by alkoxy or alkylthio groups having from 1 to 4 carbon atoms or by methyl, hydroxyl, nitro or cyano groups, $R_5$ represents hydrogen or an alkyl radical having from 1 to 3 carbon atoms, $R_6$ represents an alkyl radical having from 1 to 3 carbon atoms, and X represents an anion of an inorganic or organic acid affording salts of Formula II which are readily tolerated by the organism of animals being treated therewith.

The new compounds of the general Formula I are produced according to the invention by reacting a β-amino-propiophenone of the general Formula III

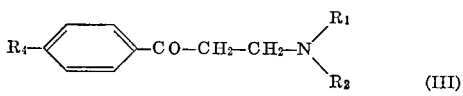

(III)

wherein $R_1$, $R_2$ and $R_4$ have the meanings given above, with a quaternising agent of the general Formula IV

(IV)

wherein:

$R_3$ has the meanings given above and X represents a halogen atom, an alkylsulfate or alkylsulfonate group, and if desired further treating the so obtained salts, in order to exchange the anions, by other inorganic or organic acids.

The new compounds of the general Formula II may also be obtained by reacting a β-halogen-propiophenone of the general Formula V

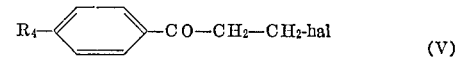

(V)

wherein "hal" represents chlorine or bromine and $R_4$ has the meanings given above with a tertiary amine of the general Formula VI

(VI)

wherein $R_1$, $R_2$ and $R_3$ have the meanings given above and, if desired, further treating the so obtained salts as described above.

Alkyl halides, particularly methyl iodide, dialkyl sulfates and toluene sulfonic acid esters can be used as quaternising agents. The tertiary amines of Formula III which are quaternised to form the active ingredients of Formula I can be produced either by condensing an acetophenone derivative with formaldehyde and the salt of a secondary amine, or by reacting a benzoyl chloride derivative with tetrachloroethane in the presence of aluminium chloride and then reacting with a secondary amine. If the anion of the quaternary ammonium salts is toxic to the animal organism, then this can be exchanged for one of a suitable acid mentioned hereinbefore.

The compositions according to the invention can contain, for example, the active substances of Formulas I and II the preparation of which is described in the following non-limitative examples. Parts and percentages are given therein by weight unless expressly stated otherwise. Temperatures are in degrees centigrade.

EXAMPLE 1

224 parts of β - dimethylamino-4-(N'-methyl-N'-tosyl-amino)-propiophenone hydrochloride are added to a solution of 90 parts by volume of glacial acetic acid and 450 parts by volume of 70% (v./v.) sulfuric acid and the whole is refluxed for 10 minutes. The reaction mixture is poured onto ice, made alkaline with sodium carbonate until its pH is 8, extracted with chloroform and then the chloroform solution obtained is evaporated to dryness.

117 parts of the β - dimethylamino - 4 - methylamino - propiophenone thus obtained are dissolved in 1200 parts by volume of acetone, 100 parts of methyl iodide are added and the whole is stirred for 15 minutes. The precipitate formed is filtered off, washed with acetone and then dried. The N-[β-(4 - methylaminobenzoyl) - ethyl]-trimethyl ammonium iodide obtained melts at 188–190°.

EXAMPLE 2

7.0 parts of dimethyl sulfate dissolved in 50 parts by volume of acetonitrile are added to a 0°-cold solution of 10 parts of 3,4'-bis-dimethylaminopropiophenone (produced from 150 parts of 4-dimethylaminoacetophenone, 40.5 parts of paraformaldehyde and 83 parts of dimethylamine hydrochloride) and 100 parts by volume of acetonitrile. The mixture is stirred for 2 hours and the precipitate formed is filtered off. The N-[β-(4-dimethylaminobenzoyl)-ethyl] - trimethyl ammonium methosulphate obtained melts at 154–157°.

EXAMPLE 3

9 parts of allyl bromide dissolved in 20 parts by volume of acetone are added to a solution of 15 parts of 3,4'-bis-dimethylaminopropiophenone in 100 parts by volume of acetone at 0°. The reaction mixture is stirred for 30 minutes and the precipitate formed is filtered off. N-[β-(4 - dimethylaminobenzoyl)-ethyl-N-dimethyl-N-allyl ammonium bromide is obtained, M.P. 167°–169°.

EXAMPLE 4

17 parts of N-[β-(4-dimethylaminobenzoyl)-ethyl-trimethyl ammonium methosulfate are dissolved in 35 parts by volume of water. This solution is filtered and added to a solution of 11 parts of disodium pamoate in 125 parts by volume of water. The reaction mixture is stirred for 1 hour at 10°. The aqueous phase is decanted and the oily phase is taken up in salt solution. The oil crystallizes whereupon the crystalline mass is washed three times with water, filtered off and dried at 30°/12 torr. The N-[β-(4-dimethylaminobenzoyl) - ethyl] - trimethyl ammonium pamoate obtained melts at 115° with decomposition.

EXAMPLE 5

25 parts of N-[β-(4-dimethylaminobenzoyl)-ethyl]-trimethyl ammonium methosulfate are dissolved in 50 parts by volume of water. The filtrate is added to a 0° cold solution of 9 parts of sodium fluoroborate (NaBF$_4$) in 50 parts by volume of water and the whole is stirred. After 10 minutes, the precipitate formed is filtered off, taken up in a little water, again filtered off and dried. The N-[β-(4-dimethylaminobenzoyl)-ethyl]-trimethyl ammonium fluoroborate obtained melts at 214–218°.

EXAMPLE 6

A mixture consisting of 10 parts of 3,4'-bis-dimethylamino-propiophenone, 100 parts by volume of anhydrous acetone and 11 parts of benzoyl iodide is stirred for 15 minutes at room temperature and then filtered. The N-[β-(4 - dimethylaminobenzoyl) - ethyl] - N,N'-dimethyl-N-benzyl ammonium iodide formed melts at 153–156°.

EXAMPLE 7

24 parts of 4'-(N - methyl - N - acetylamino)-3-chloro-propiophenone are dissolved in 400 parts by volume of acetone. 10 parts of a 40% by volume aqueous trimethylamine solution are added to this solution and then the whole is left to stand for 30 minutes. The precipitate formed is filtered off and dried. The N-[β-(4-N-methyl-N-acetylaminobenzoyl)-ethyl]-trimethyl ammonium chloride formed (M.P. 168–171°) is refluxed with 2 parts of 7 N hydrochloric acid for 30 minutes whereupon the solution is evaporated in vacuo. The residue is taken up in ethyl alcohol, filtered and washed with acetone. The N-[β-(4 - methylaminobenzoyl) - ethyl] - trimethyl ammonium chloride melts at 162–164°.

In an analogous manner and from correspondingly substituted starting materials of Formulas III and IV, compounds of Formulas I and II can be prepared, in which the substituents $R_1$, $R_2$, $R_3$ and $R_4$ are those given in the respective columns of Table I below.

TABLE I

| No: | $R_1$ | $R_2$ | $R_3$ | $R_4$ | X |
|---|---|---|---|---|---|
| 1 | $CH_3$ | $CH_3$ | $CH_3$ | $NHCH_3$ | Cl |
| 2 | $CH_3$ | $CH_3$ | $CH_3$ | $NHCH_3$ | I |
| 3 | $CH_3$ | $CH_3$ | $CH_3$ | $NHCH_3$ | $CH_3SO_4$ |
| 4 | $CH_3$ | $-CH_2-\langle\phantom{O}\rangle$ | $CH_3$ | $NHCH_3$ | I |
| 5 | $CH_3$ | $CH_3$ | $CH_3$ | $NHC_2H_5$ | I |
| 6 | $CH_3$ | $CH_3$ | $CH_3$ | $NHC_3H_7$ | I |
| 7 | $CH_3$ | $CH_3$ | $CH_3$ | $N(CH_3)_2$ | Cl |
| 8 | $CH_3$ | $CH_3$ | $CH_3$ | $N(CH_3)_2$ | I |
| 9 | $CH_3$ | $CH_3$ | $CH_3$ | $N(CH_3)_2$ | $CH_3SO_4$ |
| 10 | $CH_3$ | $CH_3$ | $CH_3$ | $N(CH_3)_2$ | (¹) |
| 11 | $CH_3$ | $CH_3$ | $CH_3$ | $N(CH_3)_2$ | (²) |
| 12 | $CH_3$ | $CH_3$ | $CH_3$ | $N(CH_3)_2$ | $BF_4$ |
| 13 | $CH_3$ | $C_2H_5$ | $C_2H_5$ | $N(CH_3)_2$ | I |
| 14 | n-$C_3H_7$ | n-$C_3H_7$ | $CH_3$ | $N(CH_3)_2$ | I |
| 15 | n-$C_4H_9$ | n-$C_4H_9$ | $CH_3$ | $N(CH_3)_2$ | I |
| 16 | sec-$C_4H_9$ | $CH_3$ | $CH_3$ | $N(CH_3)_2$ | $CH_3SO_4$ |
| 17 | $-CH_2-CH=CH_2$ | $CH_3$ | $CH_3$ | $N(CH_3)_2$ | Br |
| 18 | $-CH_2-C\equiv CH$ | $CH_3$ | $CH_3$ | $N(CH_3)_2$ | Br |
| 19 | $-CH_2-CH=CH-CH_3$ | $CH_3$ | $CH_3$ | $N(CH_3)_2$ | Br |
| 20 | $-CH_3$ | $-CH_2-\langle\phantom{O}\rangle$ | $CH_3$ | $N(CH_3)_2$ | I |
| 21 | $-CH_3$ | $-CH_2-\langle\phantom{O}\rangle-Cl$ | $CH_3$ | $N(CH_3)_2$ | I |
| 22 | $-CH_3$ | $-CH_2-\langle\phantom{O}\rangle-Br$ | $CH_3$ | $N(CH_3)_2$ | I |
| 23 | $-CH_3$ | $-CH_2-\langle\phantom{O}\rangle-OH$ | $CH_3$ | $N(CH_3)_2$ | I |
| 24 | $-CH_3$ | $-CH_2-\langle\phantom{O}\rangle-NO_2$ | $CH_3$ | $N(CH_3)_2$ | I |
| 25 | $-CH_3$ | $-CH_2-\langle\phantom{O}\rangle-CH_3$ | $CH_3$ | $N(CH_3)_2$ | I |
| 26 | $CH_3$ | $-CH_2-\langle\phantom{O}\rangle-CN$ | $CH_3$ | $N(CH_3)_2$ | I |
| 27 | $CH_3$ | $-CH_2-\langle\phantom{O}\rangle-OCH_3$ | $CH_3$ | $N(CH_3)_2$ | I |

See footnotes at end of table.

TABLE I (Continued)

| No. | R₁ | R₂ | R₃ | R₄ | X |
|---|---|---|---|---|---|
| 28 | CH₃ | 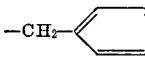 —CH₂—⟨ ⟩—OC₄H₉ | CH₃ | N(CH₃)₂ | I |
| 29 | CH₃ | 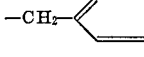 —CH₂—⟨ ⟩—SCH₃ | CH₃ | N(CH₃)₂ | I |
| 30 | CH₃ | 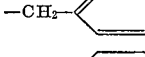 —CH₂—⟨ ⟩—SC₄H₉ | CH₃ | N(CH₃)₂ | I |
| 31 | CH₃ | 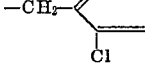 —CH₂—⟨ ⟩—Cl, Cl | CH₃ | N(CH₃)₂ | I |
| 32 | CH₃ | 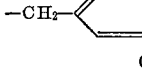 —CH₂—⟨ ⟩—Cl, Cl | CH₃ | N(CH₃)₂ | I |
| 33 | CH₃ | 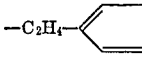 —C₂H₄—⟨ ⟩—Cl | CH₃ | N(CH₃)₂ | I |
| 34 | CH₃ | 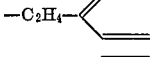 —C₂H₄—⟨ ⟩—Br | CH₃ | N(CH₃)₂ | I |
| 35 | CH₃ | 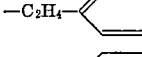 —C₂H₄—⟨ ⟩—OH | CH₃ | N(CH₃)₂ | I |
| 36 | CH₃ | 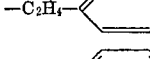 —C₂H₄—⟨ ⟩—CH₃ | CH₃ | N(CH₃)₂ | I |
| 37 | CH₃ | 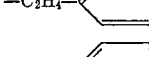 —C₂H₄—⟨ ⟩—OCH₃ | CH₃ | N(CH₃)₂ | I |
| 38 | CH₃ | 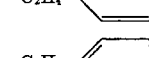 —C₂H₄—⟨ ⟩—OC₄H₉ | CH₃ | N(CH₃)₂ | I |
| 39 | CH₃ | 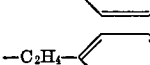 —C₂H₄—⟨ ⟩—SCH₃ | CH₃ | N(CH₃)₂ | I |
| 40 | CH₃ | 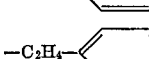 —C₂H₄—⟨ ⟩—SC₄H₉ | CH₃ | N(CH₃)₂ | I |
| 41 | CH₃ | 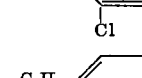 —C₂H₄—⟨ ⟩—Cl, Cl | CH₃ | N(CH₃)₂ | I |
| 42 | CH₃ | 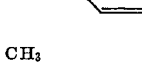 —C₂H₄—⟨ ⟩—Cl, Cl | CH₃ | N(CH₃)₂ | I |
| 43 | CH₃ | CH₃ | CH₃ | N(C₂H₅)₂ | I |
| 44 | 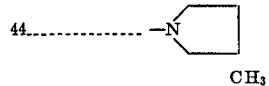 | | CH₃ | N(CH₃)₂ | I |
| 45 | 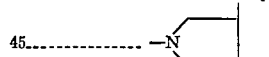 | | CH₃ | N(CH₃)₂ | I |
| 46 | 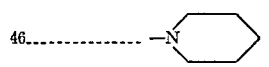 | | CH₃ | N(CH₃)₂ | I |
| 47 | 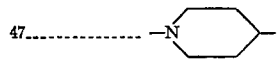 | | CH₃ | N(CH₃)₂ | I |
| 48 | 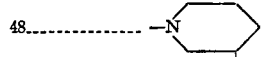 | | CH₃ | N(CH₃)₂ | I |
| 49 |  | | CH₃ | N(CH₂)₂ | I |
| 50 |  | | CH₃ | N(CH₃)₂ | I |
| 51 | CH₃ | CH₃ | CH₃ | N(C₃H₇)₂ | I |

¹ 3-hydroxy-2-naphthoate.
² Pamoate.

The feed additives according to the invention can contain besides the compounds of general Formula II listed above also e.g. the compounds falling under the general Formula I, which are produced in an analogous manner from correspondingly substituted starting materials and the substituents $R_1$, $R_2$, $R_3$, $R_4$ and anion X of which are given in the respective columns of Table II below.

protracted administration. The concentration in which the active substances in the form of such agents are added, e.g. to feeds or liquids given to animals are between 0.01 and 1% by weight.

To prepare the forms of application given above, conventional solid carriers can be used, for example kaolin, talcum, bentonite, sodium chloride, calcium phosphate,

TABLE II

| No. | $R_1$ | $R_2$ | $R_3$ | $R_4$ | X |
|---|---|---|---|---|---|
| 1 | —$CH_3$ | —$CH_3$ | —$CH_3$ | H | I |
| 2 | —$CH_3$ | —$CH_3$ | —$CH_3$ | H | $CH_3SO_4$ |
| 3 | —$CH_3$ | —$CH_2$—⟨C₆H₅⟩ | —$CH_3$ | H | I |
| 4 | $C_2H_5$ | —$C_2H_5$ | $C_2H_5$ | H | I |
| 5 | —$CH_3$ | —$CH_3$ | —$CH_3$ | Cl | I |
| 6 | —$CH_3$ | —$CH_3$ | —$CH_3$ | —OH | I |
| 7 | —$CH_3$ | —$CH_2$—⟨C₆H₅⟩ | —$CH_3$ | H | Cl |
| 8 | —$CH_3$ | —$CH_3$ | —$CH_3$ | Br | Br |
| 9 | —$CH_3$ | —$CH_3$ | —$CH_3$ | F | I |
| 10 | —$CH_3$ | —$CH_3$ | —$CH_3$ | —$CH_3$ | I |
| 11 | —$CH_3$ | —$CH_3$ | —$CH_3$ | —$C_2H_5$ | I |
| 12 | —$CH_3$ | —$CH_3$ | —$CH_3$ | —n-$C_3H_7$ | I |
| 13 | —$CH_3$ | —$CH_3$ | —$CH_3$ | —t-$C_4H_9$ | I |
| 14 | —$CH_3$ | —$CH_3$ | —$CH_3$ | $C_9H_{19}$ | I |
| 15 | —$CH_3$ | —$CH_3$ | —$CH_3$ | $C_{12}H_{25}$ | $CH_3SO_4$ |
| 16 | —$CH_3$ | —$CH_3$ | —$CH_3$ | —O$CH_3$ | I |
| 17 | —$CH_3$ | —$CH_3$ | —$CH_3$ | —O$CH_3$ | $CH_3SO_4$ |
| 18 | —$CH_3$ | —$CH_3$ | —$CH_3$ | —O$CH_3$ | $ClO_4$ |
| 19 |  | —N⟨C₅H₁₀⟩ | —$CH_3$ | —O$CH_3$ | $CH_3SO_4$ |
| 20 | —$CH_3$ | —$CH_3$ | —$CH_3$ | —O $C_2H_5$ | $CH_3SO_4$ |
| 21 | —$CH_3$ | —$CH_3$ | —$CH_3$ | —O—i$C_3H_7$ | $CH_3SO_4$ |
| 22 | —$CH_3$ | —$CH_3$ | —$CH_3$ | —O—n$C_4H_9$ | $CH_3SO_4$ |
| 23 | —$CH_3$ | —$CH_3$ | —$CH_3$ | —O—n$C_5H_{11}$ | $CH_3SO_4$ |
| 24 | —$CH_3$ | —$CH_3$ | —$CH_3$ | —O—n$C_8H_{17}$ | $CH_3SO_4$ |
| 25 | —$CH_3$ | —$CH_3$ | —$CH_3$ | —O—$C_{12}H_{25}$ | $CH_3SO_4$ |
| 26 | —$CH_3$ | —$CH_3$ | —$CH_3$ | —S—$CH_3$ | $CH_3SO_4$ |
| 27 | —$CH_3$ | —$CH_3$ | —$CH_3$ | —S—$C_2H_5$ | I |
| 28 | —$CH_3$ | —$CH_3$ | —$CH_3$ | —$NH_2$ | Cl |
| 29 | —$CH_3$ | —$CH_3$ | —$CH_3$ | —$NH_2$ | I |
| 30 | —$CH_3$ | —$CH_3$ | —$CH_3$ | —$NH_2$ | $CH_3SO_4$ |
| 31 | —$CH_3$ | —$CH_3$ | —$CH_3$ | —$NH_2$ | (¹) |
| 32 | —$CH_3$ | —$CH_3$ | —$CH_3$ | —$NH_2$ | (²) |
| 33 | —$CH_3$ | —$CH_2$—⟨C₆H₅⟩ | —$NH_2$ | —$NH_2$ | I |
| 34 | —$C_2H_5$ | —$C_2H_5$ | —$CH_3$ | —$NH_2$ | I |
| 35 |  | —N⟨C₅H₁₀⟩ | —$CH_3$ | —$NH_2$ | I |
| 36 | —$CH_3$ | —$CH_3$ | —$CH_3$ | —NHCOOH | I |
| 37 | —$CH_3$ | —$CH_3$ | —$CH_3$ | —NHCO$CH_3$ | I |
| 38 | —$CH_3$ | —$CH_3$ | —$CH_3$ | —NHCO$C_2H_5$ | I |
| 39 | —$CH_3$ | —$CH_3$ | —$CH_3$ | —NHCO—sec-$C_4H_9$ | I |
| 40 | —$CH_3$ | —$CH_3$ | —$CH_3$ | NHCO—⟨C₆H₅⟩ | I |
| 41 | —$CH_3$ | —$CH_3$ | —$CH_3$ | $NO_2$ | I |

¹ Pamoate.
² 3-hydroxy-2-naphthoate.

Anthelmintic compositions, including feed additives according to the invention, which contain as active ingredients the compounds of the general Formula I, can be administered directly to animals in the form of solutions, emulsions, suspensions, drenches, powders, tablets or boluses or in the form of gelatin capsules, or they can be admixed to their feed.

The active substances of Formulas I and II, which have a marked anthelmintic action against the most varied types of helminths such as Ascaridae, Trichuridae, Strongyloidae, Anoplocephalidae, Taeniidae, Hymenolepididae, in pets and domestic animals such as cattle, pigs, horses, sheep, goats, dogs, cats and fowls, can be administered to helminth-infested animals or to animals to be protected against helminths in the form of therapeutical preparations either as one single dose or repeatedly, the single dosage, depending on the type of animal, preferably between 10 and 1000 mg. per kg. body-weight. In some cases better results are obtained or the total amount required for a cure can be decreased by hydrocarbons, cellulose powder, carbowaxes, gelatins, or liquids such as water, if desired with the addition of surface active agents, ionic or non-ionic dispersing agents or emulsifying agents, oils and other solvents which do not injure the animal organism. These agents can also be added in solid form to the animals' feed. Suitable carrier materials in feed concentrates (feed additives) are, among others and in addition to those mentioned above, energy-producing feed, grain feed, protein concentrates, fish meal, soya-bean meal, cotton seed meal and linseed meal. Such a concentrate, usually having a concentration of about 25% by weight, is then thoroughly mixed with other conventional feed additives or fillers, such as mineral agents, vitamins, antibiotics, chemotherapeutics, bacteriostatics, fungistatics, coccidiostatics, hormone preparations, substances having an anabolic action or other substances which promote growth, influence the quality of the meat of animals to be slaughtered or are useful to the animal organism in any other way. In this manner, a "premixture" (feed additive) is obtained which contains, e.g. 5–10% by weight of the active substance of the general Formula I. A suitable amount of this pre-mixture is then equally distributed by means of a mixer in a usual commercial food such as a grain mixture or other vegetable or animal substances. The finished feed contains the substances of Formula I preferably in a concentration of about 0.01–1% by weight.

Tests performed on hens and mice suffering from helminthiasis are described below.

Tests on hens infested with *Ascaridia galli*

5 to 6 week old chickens were artifically infested with *Ascaridia galli* (maw worms). Groups each containing 5 hens were used for each test. The active substances were administered to the animals in two doses per day over a period of 3 days. Hens infested at the same time but not treated are used as control animals.

The number of *Ascaridia galli* eliminated by each group of test animals within 5 days after the first administration of the first dose of active substance was determined daily as well as the number of worms still found in the intestine at necropsy on the 5th day of the test. In addition, the number of hens no longer infested with worms was also determined.

| Substance | Total daily dose, mg./kg. body weight | *Ascarida galli* eliminated from 5 hens in 4 days | | No. of hens free from worms in 5 hens |
|---|---|---|---|---|
| | | Absolute No. | Percent of the number of worms in 5 hens | |
| N-(β-benzoylethyl)-trimethyl ammonium iodide | 1,000 | 78 | 100 | 5 |
| N-(β-benzoylethyl)-trimethyl ammonium methosulphate | 500 | 117 | 100 | 5 |
| N-[β-(4-methylbenzoyl)-ethyl]-trimethyl ammonium iodide | 1,000 | 228 | 100 | 5 |
| N-[β-(4-hydroxybenzoyl)-ethyl]-trimethyl ammonium iodide | 500 | 305 | 96 | 4/5 |
| N-[β-(4-hydroxybenzoyl)-ethyl]-trimethyl ammonium iodide | 500 | 185 | 100 | 5 |
| N-[β-(4-aminobenzoyl)-ethyl]-dimethylbenzyl ammonium iodide | 500 | 103 | 93 | 3/5 |
| N-[β-(4-methoxybenzoyl)-ethyl]-trimethyl ammonium iodide | 500 | 70 | 98 | 4/5 |
| N-[β-(4-methoxybenzoyl)-methyl]-N-methyl piperidinium methosulphate | 500 | 168 | 100 | 5 |
| N-[β-(4-dimethylaminobenzoyl)-ethyl]-trimethylammonium iodide | 500 | 218 | 100 | 5 |
| N-[β-(4-dimethylaminobenzoyl)-ethyl]-methyldiethylammonium iodide | 500 | 104 | 99 | 4/5 |
| N-[β-(4-dimethylaminobenzoyl)-ethyl]-N-benzyl-dimethyl-ammonium iodide | 500 | 159 | 100 | 5 |
| N-[β-(4-dimethylaminobenzoyl)-ethyl]-1,4-dimethylpiperidinium iodide | 500 | 54 | 100 | 5 |
| N-[β-(4-dimethylaminobenzoyl)-ethyl]-1,3-dimethyl-piperidinium iodide | 500 | 107 | 100 | 5 |
| N-[β-(4-dimethylaminobenzoyl)-ethyl]-N-methyl piperidinium iodide | 500 | 123 | 76 | 2/5 |
| N-[β-(4-methylaminobenzoyl)-ethyl]-trimethylammonium iodide | 500 | 169 | 100 | 5 |
| Controls | | 143 | | |
| Controls | | 105 | | |

Tests on mice infested with *Hymenolepis nana*

The active ingredients, in the form of a suspension, were administered by artificial feeding to white mice which had been artificially infested with *Hymenolepis nana*. Five animals were used for each test. The active ingredients were administered to each group of animals on 3 or 4 consecutive days and then the animals were dissected on the 8th day after the beginning of the treatment.

The results were evaluated by counting the number of tape worms in the intestines of the dead animals. Untreated mice which had been infested at the same time served as controls.

| Substance | Daily dose, mg./kg. | length of treatment, days | Infestation of 5 animals with *Hymenolepis nana* |
|---|---|---|---|
| N-[β-(4-aminobenzoyl)-ethyl]-trimethyl ammonium iodide | 300 | 4 | 0-0-0-0-2 |
| N-[β-(4-aminobenzoyl)-ethyl]-trimethyl ammonium methosulphate | 400 | 3 | 0-0-0-0-0 |
| N-[β-(4-aminobenzoyl)-ethyl]-diethylmethyl ammonium iodide | 750 | 4 | 0-0-0-0-0 |
| N-[β-(4-dimethylaminobenzoyl)-ethyl]-trimethyl ammonium iodide | 300 | 3 | 0-0-0-2-6 |
| Do | 500 | 4 | 0-0-0-0-0 |
| N-[β-(4-benzaminobenzoyl)-ethyl]-trimethyl ammonium iodide | 750 | 3 | 0-0-0-0-0 |
| Controls | | | 20-7-3-5-5 |
| Do | | | 17-1-3-42-8 |
| Do | | | 6-15-6-5-13 |

The following non-limitative examples illustrate the preparation of the feed concentrates and feed additive according to the invention. Parts and percentages are given therein by weight unless expressly stated otherwise.

EXAMPLE I

A wettable powder is produced by thoroughly milling and mixing 50 parts of N-[β-(4-aminobenzoyl)-ethyl]-N,N-dimethyl-N-benzyl ammonium iodide, 30 parts of a synthetic calcium silicate (Microcell), 19.5 parts of kaolin and 0.5 part of a solid condensation product obtained from ethylene oxide and propylene oxide having a molecular weight of about 8000, having a central block of propylene polymer of an average molecular weight of about 1500 flanked on each side by ethylene oxide polymer (for example the commercially available "Pluronics F 68"). When this mixture is stirred with water, a pulpy concentrate is obtained which is particularly suitable for administration to pets and domestic animals.

Similar results are obtained when replacing the ammonium salt in the above composition by an equal amount of one of the compounds listed in Tables I and II.

EXAMPLE II 1 part of N-[β-(4-aminobenzoyl)-ethyl]-trimethyl ammonium iodide is carefully mixed with 19 parts of sodium chloride and this mixture is administered to the animals in such amounts that a daily dosage of 10–1000 mg. active substance per kg. bodyweight is taken. Such salt mixtures can also be incorporated into boluses or gelatin capsules and administered to the animals as such.

Such a sodium chloride preparation is mixed with raw minced meat and the mixture is fed to dogs infested with Ascaridae and Trichurae. 20 mg. of active ingredient per kilogramme body weight is given as a single dose. After 3 days there were no more Ascaridae eggs and after 14 days there were solitary Trichurae eggs in the excrement of the treated dogs.

EXAMPLE III

A 10% feed concentrate (basic feed) is produced from the following components:

10 parts of N-[β-(4-hydroxybenzoyl)-ethyl]-N-dimethylbenzyl ammonium iodide
10 parts of Champagne chalk
80 parts of a chicken feed of the following composition: 4–5 parts of roughage, 20 parts of crude protein, 64–65 parts of total nutrients, and 8–11 parts of vitamins and quartz sand.

This mixture together with standard chicken feed was fed to hens infested with Ascaridae. The concentration of active substance in the feed was 0.25–0.5%. After 4 days, 98% of the worms had been excreted and the hens were free of worms to all intents and purposes.

EXAMPLE IV

A 50% powder of the following composition:

50 parts of N-[β-(4-methylthiobenzoyl)-ethyl]-N-trimethyl ammonium iodide
0.8 part of sodium benzoate
2 parts of tylose/kaolin mixture 1:1
0.05 part of sodium lauryl sulphate
5 parts of sorbitol monostearate
92.15 parts of white flour is produced by thoroughly mixing the individual components. This powder is diluted with liquid or pulpy foodstuffs and given in this form to pets and domestic animals. A few days after treatment, no more worms or eggs are excreted by the animals and they are free of worms to all intents and purposes.

EXAMPLE V 50 parts of N-[β-benzoylethyl]-trimethyl ammonium iodide are thoroughly mixed with 0.8 part of sodium benzoate, 2 parts of tylose, 5 parts of sorbitan monooleate and 42.2 parts of white flour to form a 50% concentrate which can be dispersed in any concentration desired e.g. in water or milk.

50 four week old chickens having an average weight at the beginning of the test of 455 g. were fed for 37 days with a chicken fatening food. The food was mixed with the above feed concentrate in such amounts that the content of active substances in the food given was 0.01%.

50 chickens of the same breed and age having an average weight at the beginning of the test of 455 g. were fed with the same chicken fattening food without the addition of the concentrate. After 37 days, the average weight of the untreated chickens was 1107 g. whilst that of the treated chicken was 1190, which corresponds to an about 7% higher weight. The total amount of food eaten by both groups was the same.

EXAMPLE VI 10 parts of N-[β-(4-methoxybenzoyl)-ethyl]-N-methyl-piperidinium methosulphate are thoroughly mixed with 90 parts of a concentrated feed meal which is well balanced with regard to its nutritional content. The concentrated feed meal consists of:

Roughage—4.5%
Crude protein—18.5%
Digestible protein—15.7%
Total nutrients—66.5%
Vitamin A—9000 IU/kg.
Vitamin $D_3$—1200 IU/kg.
Vitamin $B_2$—6 mg./kg.

The feed additive can be fed to pigs and sheep as such in a measured quantity or can be included in a 0.01–1% admixture (weight content of active substance) in the normal feed. Higher doses are administered over a shorter time, lower doses are given over a more extended time. The general condition of the animals is improved and simultaneously a better rate of weight gain is attained.

EXAMPLE VII

The active substance, N-(β-benzoylethyl)-trimethyl ammonium methosulphate, is intimately blended with a feed containing:

roughage—4–5%
crude protein—18–20%
total nutrients—67–70%
vitamin A—12,000 IU/kg.
vitamin $D_3$—1,500 IU/kg.
vitamin $B_2$—8 mg./kg.

to form a 0.05–0.5% active substance-containing feed mixture. This mixture is specially suited for feeding fowls. Fowls fed with said mixture show within 4 weeks an about 7% better rate of weight gain than those fed with normal feed.

EXAMPLE VIII

N-[β-(4-methylbenzoyl)-ethyl]-trimethyl ammonium iodide is triturated with dextrin or sugar to form a 20% concentrate. 1 g. of this mixture is dissolved in 1 liter of full cream milk and the solution is given to 10–20 day old calves once daily for four weeks. The calves fed in this way with 200 mg. of active substance per liter of milk showed an about 5% better increase in weight after 4–5 months than those which received no additive in the milk.

EXAMPLE IX

N-[β-(4-aminobenzoyl)-ethyl]-dimethylbenzyl ammonium iodide is triturated with a previously sieved feed of the composition:

roughage—4–6%
crude protein—18–20%
total nutrients—67–70%
vitamin A—4000 IU/kg.
vitamin $D_3$—600 IU/kg.

to form a 5% active substance-containing concentrate. Portions of this mixture were mixed with a commercial pig meal and fed to young pigs so that each animal at each feed received 100 mg. of active substance per kilogramme of pig meal.

20 young piglets having an average weight of 20 kg. at the beginning of the test were fed for 2 weeks with a feed which was mixed with this concentrate (feed additive) in such amounts that the content of active ingredient was 0.005%.

20 young piglets having the same average weight (20 kg.) received the same amounts of the same feed but without the addition of active ingredient to the feed.

After a period of 10 weeks, the test piglets were again fed for 2 weeks with feed concentrate containing active substance in the same amounts as given above. In the interval (10 weeks) and for 6 weeks after the second treatment period they received quantitatively and qualitatively the same feed without the feed additive as the control animals.

Before slaughtering, i.e. after, in all, 20 weeks from the beginning of the test, the average weight of the test animals was 108 kg. whilst that of piglets which received the feed without the additive was only 92 kg. Thus, the improvement in the weight increase of the animals nourished with the feed containing active ingredient was 14.8%.

EXAMPLE X

A poultry feed of the following composition is prepared—

| Basic feed: | G. |
|---|---|
| Semolina | 220 |
| Coarsely ground maize | 220 |
| Coarsely ground barley | 80 |
| Groats | 60 |
| Suet | 50 |
| Codfish meal | 100 |
| Fish meal | 30 |
| Skimmed milk powder | 20 |
| Soya cake | 100 |
| Sunflower cake | 70 |
| Peanut cake | 30 |
| Bone meal | 5 |
| Calcium carbonate | 10 |
| Sodium chloride | 3 |
| Milled sand | 2 |
| | 1,000 |

The following additives are added to this basic feed per kilogramme:

| | Mg. |
|---|---|
| Lysine | 500 |
| Bacitracin zinc salt | 20 |
| Nitrofurazone | 125 |
| Trace elements: | |
| Fe | 10 |
| Cu | 1 |
| Mn | 50 |
| I | 1.5 |
| Zn | 8 |
| Vitamins B$_1$ | 1.5 |
| Vitamin B$_2$ | 4 |
| Vitamin B$_6$ | 2 |
| Vitamin B$_{12}$ | 10 |
| Nicotinic acid | 10 |
| Choline | 25 |
| Pantothenic acid | 10 |
| Folic acid | 0.5 |
| | 778.5 |

| | IU |
|---|---|
| Vitamin A | 12,000 |
| Vitamin D$_3$ | 1,000 |
| Vitamin E | 10 |

300 mg. of N-[β-(4-hydroxybenzoyl)-ethyl]-trimethyl ammonium iodide were then added per kg. to the above feed mixture and a group of white leghorn chickens of an initial weight of about 250 g. were fed with this mixture for 6 weeks. Compared with a control group over the same period, the average increase in weight was about 7%.

We claim:

1. An anthelmintic composition comprising an anthelmintically effective amount of a compound of the formula

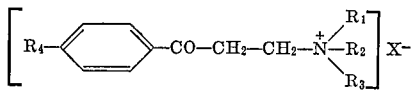

wherein:

R$_1$ represents alkyl, alkenyl or alkynyl each having at most 4 carbon atoms,

R$_2$ represents alkyl of from 1 to 4 carbon atoms; benzyl; phenethyl; a benzyl or phenethyl radical substituted in the para-position by a member selected from the group consisting of alkoxy and alkylthio, each having from 1 to 4 carbon atoms, methyl, hydroxy, and nitro; or a benzyl or phenethyl radical mono- or di-substituted by chlorine or bromine, R$_3$ represents alkyl of from 1 to 4 carbon atoms and, in the case that R$_2$ is alkyl, R$_3$ represents alkyl of from 1 to 4 carbon atoms; benzyl; phenethyl; or a benzyl or phenethyl radical substituted in the para-position by a member selected from the group consisting of alkoxy and alkylthio, each having from 1 to 4 carbon atoms, methyl, hydrogen, and nitro; or a benzyl or phenethyl radical mono- or di-substituted by chlorine or bromine, R$_4$ represents hydrogen, halogen, hydroxy, nitro, alkyl of from 1 to 12 carbon atoms, alkoxy of from 1 to 12 carbon atoms, methylthio, ethylthio, amino, mono- or dialkyl-substituted amino having from 1 to 4 carbon atoms in each alkyl moiety, alkanoylamino of at most 5 carbon atoms, alkenoylamino of at most 5 carbon atoms, or benzoylamino, and X represents an anion of a therapeutically acceptable acid, the balance of said composition consisting essentially of a therapeutically acceptable carrier compatible with said compound.

2. A composition as defined in claim 1, wherein said carrier consists essentially of a feed additive and is in the form of a tablet, gelatine capsule or bolus suitable for oral administration.

3. A feed additive for domestic and farm animals which comprises an anthelmintically effective amount of a compound of the formula

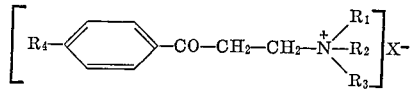

wherein:

R$_1$ represents alkyl, alkenyl or alkynyl each having at most 4 carbon atoms,

R$_2$ represents alkyl of from 1 to 4 carbon atoms; benzyl; phenethyl; a benzyl or phenethyl radical substituted in the para-position by a member selected from the group consisting of alkoxy and alkylthio, each having from 1 to 4 carbon atoms, methyl, hydroxy, and nitro; or a benzyl or phenethyl radical mono- or di-substituted by chlorine or bromine, R$_3$ represents alkyl of from 1 to 4 carbon atoms and, in the case that R$_2$ is alkyl, R$_3$ represents alkyl of from 1 to 4 carbon atoms; benzyl; phenethyl; or a benzyl or phenethyl radical substituted in the para-position by a member selected from the group consisting of alkoxy and alkylthio, each having from 1 to 4 carbon atoms, methyl, hydrogen, and nitro; or a benzyl or phenethyl radical mono- or di-substituted by chlorine or bromine, R$_4$ represents hydrogen, halogen, hydroxy, nitro, alkyl of from 1 to 12 carbon atoms, alkoxy of from 1 to 12 carbon atoms, methylthio, ethylthio, amino, mono- or dialkyl-substituted amino having from 1 to 4 carbon atoms in each alkyl moiety, alkanoylamino of at most 5 carbon atoms, alkenoylamino of at most 5 carbon atoms, or benzoylamino, and X represents an anion of a therapeutically acceptable acid, in admixture with feedstuff excipients.

4. A method for controlling helminths in domestic and farm animals, which comprises administering orally to such animal an anthelmintically effective dose of a compound of the formula

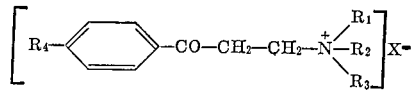

wherein:

R$_1$ represents alkyl, alkenyl or alkynyl each having at most 4 carbon atoms,

R$_2$ represents alkyl of from 1 to 4 carbon atoms; benzyl; phenethyl; a benzyl or phenethyl radical substituted in the para-position by a member selected from the group consisting of alkoxy and alkylthio, each having from 1 to 4 carbon atoms, methyl, hydroxy, and nitro; or a benzyl or phenethyl radical mono- or di-substituted by chlorine or bromine, R$_3$ represents alkyl of from 1 to 4 carbon atoms and, in the case that R$_2$ is alkyl, R$_3$ represents alkyl of from 1 to 4 carbon atoms; benzyl; phenethyl; or a benzyl or phenethyl radical substituted in the para-position by a member selected from the group consisting of alkoxy and alkylthio, each having from 1 to 4 carbon atoms, methyl, hydrogen, and nitro; or a benzyl or phenethyl radical mono- or di-substituted by chlorine or bromine, $R_4$ represents hydrogen, halogen, hydroxy, nitro, alkyl of from 1 to 12 carbon atoms, alkoxy of from 1 to 12 carbon atoms, methylthio, ethylthio, amino, mono- or dialkyl-substituted amino having from 1 to 4 carbon atoms in each alkyl moiety, alkanoylamino of at most 5 carbon atoms, alkenoylamino of at most 5 carbon atoms, or benzoylamino, and X represents an anion of a therapeutically acceptable acid.

5. A method as defined in claim 4, wherein said compound is administered in an amount of between 10 and 1000 mg. per kg. bodyweight of the treated animal.

References Cited

UNITED STATES PATENTS

| | | | |
|---|---|---|---|
| 2,686,808 | 8/1954 | Sprague | 260—567.6 |
| 2,721,220 | 10/1955 | Cavallito | 260—567.6 |
| 2,821,526 | 1/1958 | Boyd | 260—567.6 X |
| 3,000,946 | 9/1961 | Stevens | 260—567.6 X |
| 3,200,143 | 8/1965 | Copp | 260—567.6 X |

ALBERT T. MEYERS, Primary Examiner

S. J. FRIEDMAN, Assistant Examiner